United States Patent
Suga

[11] Patent Number: 6,150,665
[45] Date of Patent: Nov. 21, 2000

[54] FINGERPRINT DETECTING DEVICE HAVING A FLUID LAYER SEALED IN A GAP

[75] Inventor: Michihisa Suga, Tokyo, Japan

[73] Assignee: NEC Corporation, Tokyo, Japan

[21] Appl. No.: 09/048,044

[22] Filed: Mar. 26, 1998

[30] Foreign Application Priority Data

Mar. 27, 1997 [JP] Japan ................................ 9-075388

[51] Int. Cl.⁷ .................................................. G06K 5/00
[52] U.S. Cl. ............................. 250/556; 356/71; 382/116
[58] Field of Search .................................. 250/556, 216, 250/208.1; 356/71; 382/312, 115, 116

[56] References Cited

U.S. PATENT DOCUMENTS

| 4,322,163 | 3/1982 | Schiller ................................ 356/71 |
| 5,448,649 | 9/1995 | Chen et al. ........................... 382/126 |
| 5,745,046 | 4/1998 | Itsumi et al. ...................... 340/825.31 |

FOREIGN PATENT DOCUMENTS

| 0 194 783 | 9/1986 | European Pat. Off. . |
| 1-145785 | 6/1989 | Japan . |
| 2-18888 | 7/1990 | Japan . |
| 3-244092 | 10/1991 | Japan . |
| 6-195450 | 7/1994 | Japan . |
| 7-098754 | 4/1995 | Japan . |
| 9-167224 | 6/1997 | Japan . |
| 10-269341 | 10/1998 | Japan . |

*Primary Examiner*—Que T. Le
*Attorney, Agent, or Firm*—Foley & Lardner

[57] ABSTRACT

A fingerprint detecting device includes a flat transparent body, a light source, a thin surface film layer, a fluid layer, and an image detection unit. The transparent body on which a skin surface of a finger is pressed has a surface constituted by a scattering surface with a fine three-dimensional unevenness. The light source irradiates incident light from an inside of the transparent body on the skin surface pressed against the surface of the transparent body. The surface film layer is formed on the surface of the transparent body via a small gap, on which a three-dimensional pattern of the skin surface is transferred by pressing the finger. The fluid layer is formed by sealing one of a gas and a liquid in the gap between the surface of the transparent body and the surface film layer, and is pressed by the surface film layer on which the three-dimensional pattern of the skin surface is transferred. The image detection unit detects an image fingerprint pattern on the basis of the light from the light source, the reflection of which is changed at the surface of the transparent body, when the surface film layer comes into contact with the surface of the transparent body in accordance with the three-dimensional pattern of the skin surface.

13 Claims, 3 Drawing Sheets

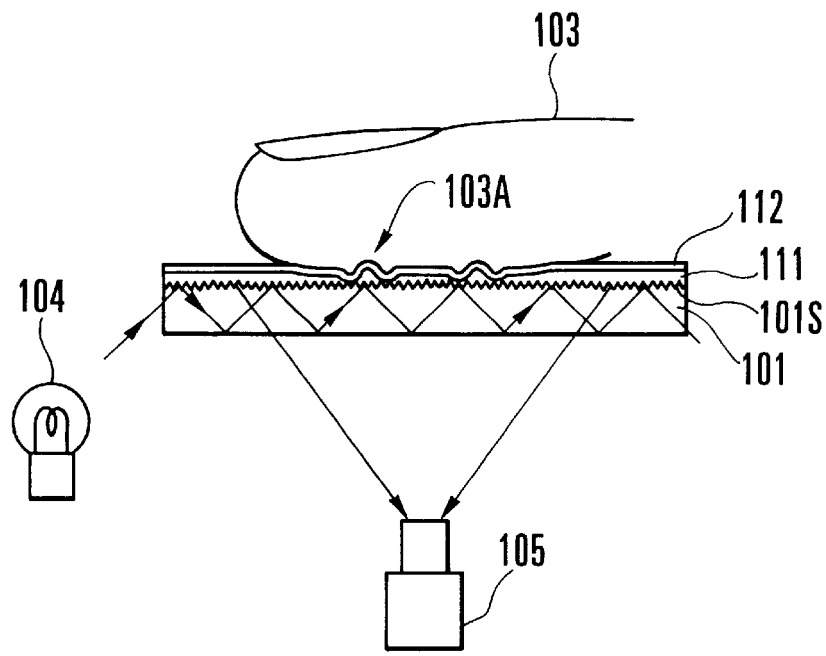
F I G. 1
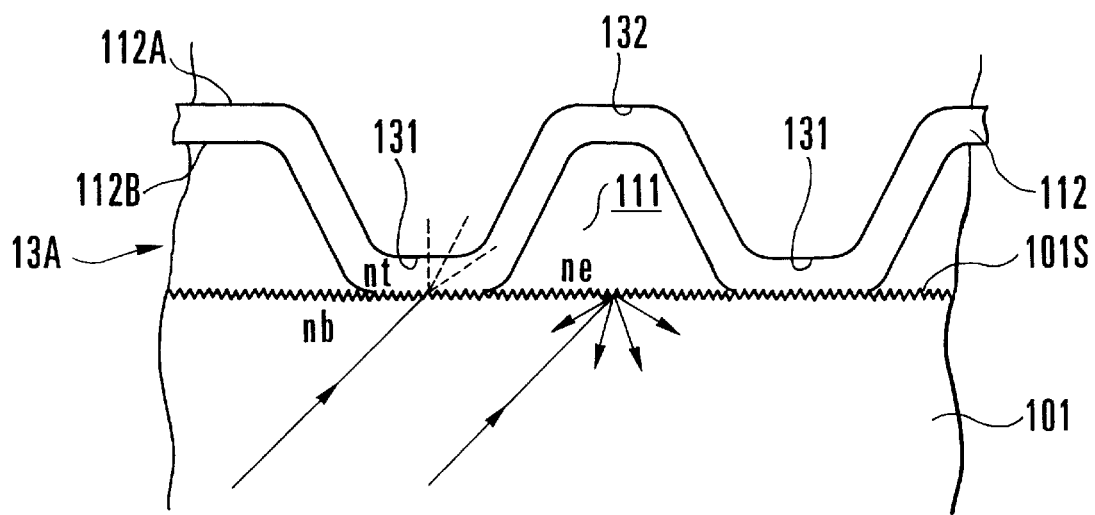
F I G. 2

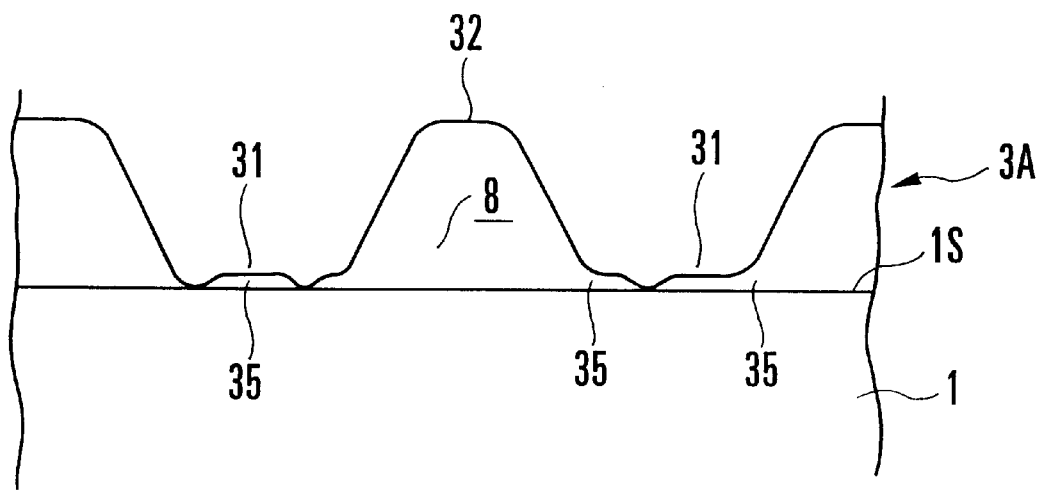
F I G. 5 A
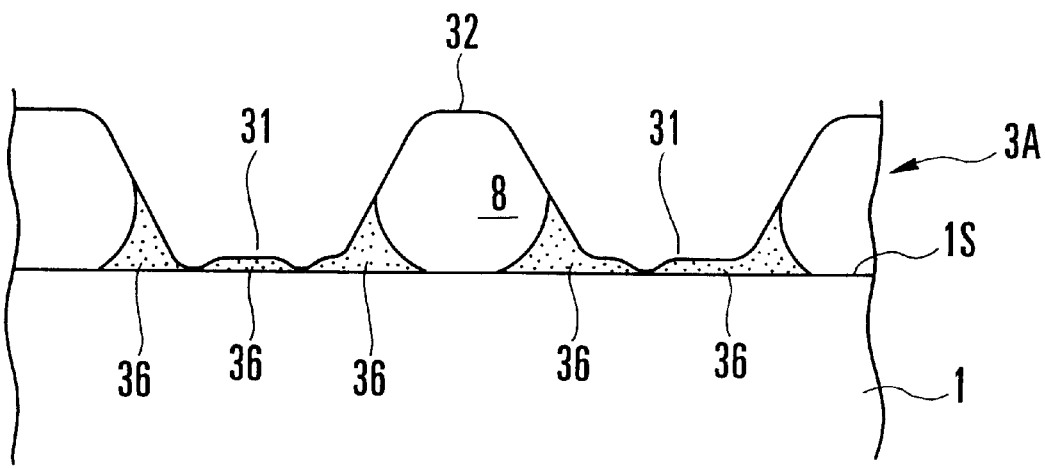
F I G. 5 B

FINGERPRINT DETECTING DEVICE HAVING A FLUID LAYER SEALED IN A GAP

BACKGROUND OF THE INVENTION

The present invention relates to a fingerprint detecting device and, more particularly, to a fingerprint detecting device which irradiates light on the skin surface of a finger through a transparent body and detects a fingerprint pattern from reflected light.

Generally, as a scheme of irradiating light on the skin surface of a finger pressed against a transparent body and detecting a fingerprint pattern from reflected light, a reflection light scheme using reflection of light on the transparent body surface has been proposed, as disclosed in Japanese Patent Laid-Open No. 1-145785.

FIG. 3 schematically shows a conventional fingerprint detecting device based on the reflection light scheme. Referring to FIG. 3, reference numeral 1 denotes a transparent body such as an optical glass member having a triangular prism shape; 1S, a surface of the transparent body 1; 3, a finger placed on the surface 1S of the transparent body 1 and having a skin surface 3A with ridge/valley portions; 4, a light source; and 5, an image detection unit. Light from the light source 4 is irradiated on the skin surface 3A through the transparent body 1, and reflected light is detected by the image detection unit 5.

In this case, the relationship in refractive index between the transparent body 1, the skin surface 3A, and air, and the angle of light incident on the surface 1S of the transparent body 1 are appropriately selected. Normally, the ridge portions (projecting portions) of the skin surface 3A contact the transparent body 1 via sweat or grease adhered on the surface of the finger. The refractive index of sweat or grease is higher than a refractive index na of air and close to a refractive index nb of the transparent body 1 such as an optical glass.

For this reason, reflection occurs only on the surface 1S of the transparent body 1 contacting the valley portions (recessed portions) of the skin surface 3A, where air is present. On the other hand, the reflection does not take place at the ridge portions of the skin surface 3A which directly contact the transparent body 1 via sweat or grease having a refractive index close to the refractive index nb of the transparent body 1, so the light transmitted through the transparent body 1 is absorbed or irregularly reflected by the finger. Therefore, the image detection unit 5 detects the fingerprint pattern of the skin surface 3A, which has bright valley portions and dark ridge portions.

As another scheme of detecting a fingerprint pattern, a scattering light scheme using scattering of light on the transparent body surface has been proposed, as disclosed in Japanese Patent Laid-Open No. 3-244092. FIG. 4 shows a conventional fingerprint detecting device using the scattering light scheme. Referring to FIG. 4, reference numeral 11 denotes a transparent body formed from parallel plates such as optical glass members; 11S, a surface of the transparent body 11; 13, a finger having a skin surface 13A with ridge/valley portions; 14, a light source; and 15, an image detection unit. Light from the light source 14 is irradiated on the skin surface 13A through the transparent body 11, and scattering light is detected by the image detection unit 15.

In this case as well, the relationship in refractive index between the transparent body 11, the skin surface 13A, and air, and the angle of light incident on the transparent body surface 11S are appropriately selected. Reflection occurs on the transparent body surface 11S contacting the valley portions (recessed portions) of the skin surface 13A, where air 18 is present, so the light does not reach the image detection unit 15.

On the other hand, the reflection does not occur at the ridge portions of the skin surface 13A which contact the transparent body 11 via sweat or grease having a refractive index close to the refractive index nb of the transparent body 11. The light passing through the transparent body 11 is absorbed by the finger 13 although the light is partially irregularly reflected and reaches the image detection unit 5. Therefore, unlike the reflection light scheme shown in FIG. 3, the image detection unit 15 detects the fingerprint pattern of the skin surface 13A, which has dark valley portions and bright ridge portions.

However, in the reflection light scheme shown in FIG. 3, the detected fingerprint pattern largely changes due to a gap between a fine three-dimensional pattern on the ridge portions of the finger 3 and the surface 1S of the transparent body 1 or the condition (dry or wet state) of the finger 3 influenced by water such as sweat, so a satisfactory fingerprint pattern cannot always be obtained.

For example, as shown in FIG. 5A, when the finger is dry, a small gap 35 is formed between a ridge portion 31 and the transparent body 1 because of the fine three-dimensional pattern on the ridge portion 31 of the skin surface 3A. Since air is present in the gap 35, light is reflected even at the ridge portions 31. On the other hand, as shown in FIG. 5B, when the finger is wet due to sweat, sweat or grease 36 is adhered between the ridge portions 31 of the skin surface 3A and the transparent body surface 1S. Light is absorbed by a portion wider than the actual ridge portion 31, so the amount of light to be reflected at a valley portion 32 is decreased.

Therefore, the ridge portion 31 of the skin surface 3A is detected not as a solid line but as a broken line depending on the condition of the finger, and more particularly, in the dry state. On the other hand, in the wet state, the ridge portions 31 and valley portions are not clearly discriminated, resulting in undesirable connection between ridge and valley pattern portions. For this reason, a satisfactory fingerprint pattern cannot always be obtained.

In the reflection light scheme shown in FIG. 3, the image detection unit 5 detects the fingerprint pattern as the obliquely photographed image data of the skin surface 3A. Distortion in this oblique image must be corrected to obtain an image viewed from the front side. In addition, since the skin surface 3A is obliquely photographed, the focal depth must be increased to obtain an appropriate in-focus position. As a result, the optical distance cannot be decreased, and size reduction is difficult.

According to the scattering light scheme shown in FIG. 4, a fingerprint pattern corresponding to the fingerprint 13A viewed from the front side can be obtained. However, since the light is irregularly reflected at the ridge portions of the fingerprint 13A, and the amount of light reaching the image detection unit 15 is small, the resultant fingerprint pattern has low contrast to the valley portions of the fingerprint 13A.

Additionally, unlike the reflection light scheme, the entire image becomes dark when no finger contacts the transparent body 11. For this reason, when a fingerprint pattern is to be detected by the image detection unit 15 using, e.g., a CCD sensor, another light source is required to adjust the white level.

SUMMARY OF THE INVENTION

It is an object of the present invention to provide a fingerprint detecting device capable of obtaining a satisfactory fingerprint pattern independently of the finger condition.

It is another object of the present invention to provide a fingerprint detecting device capable of obtaining a fingerprint pattern viewed from the front of a skin surface with ridge/valley portions.

In order to achieve the above object, according to the present invention, there is provided a fingerprint detecting device comprising a flat transparent body on which a skin surface of a finger is pressed, the transparent body having a surface constituted by a scattering surface with a fine three-dimensional unevenness, on which the skin surface is pressed, a light source for irradiating incident light from an inside of the transparent body on the skin surface pressed against the surface of the transparent body, a thin surface film layer formed on the surface of the transparent body via a small gap, on which a three-dimensional pattern of the skin surface is transferred by pressing the finger, a fluid layer formed by sealing one of a gas and a liquid in the gap between the surface of the transparent body and the surface film layer, the fluid layer being pressed by the surface film layer on which the three-dimensional pattern of the skin surface is transferred, and image detection means for detecting an image fingerprint pattern on the basis of the light from the light source, the reflection of which is changed at the surface of the transparent body, when the surface film layer comes into contact with the surface of the transparent body in accordance with the three-dimensional pattern of the skin surface.

BRIEF DESCRIPTION OF THE DRAWINGS

FIG. 1 is a schematic view of a fingerprint detecting device according to an embodiment of the present invention;

FIG. 2 is an enlarged view for explaining the behavior of light on the surface of a transparent body shown in FIG. 1;

FIG. 5A is a view showing a contact state in which a dry finger is pressed against the surface of a transparent body; and FIG. 5B is a view showing a contact state in which a wet finger is pressed against the surface of the transparent body.

DESCRIPTION OF THE PREFERRED EMBODIMENT

Figure 3:
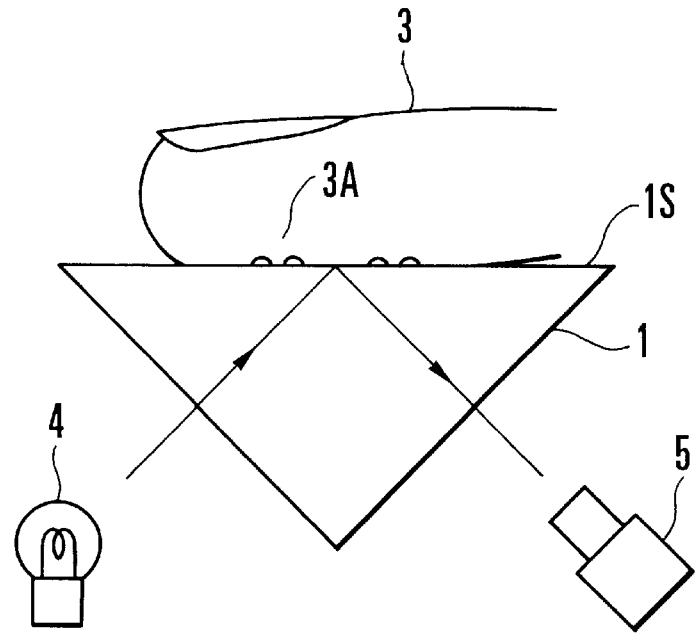
FIG. 3 is a schematic view of a conventional fingerprint detecting device (reflection light scheme)

The present invention will be described below with reference to the accompanying drawings.

FIG. 1 shows a fingerprint detecting device according to an embodiment of the present invention. Referring to FIG. 1, reference numeral 101 denotes a transparent body which consists of parallel plates such as optical glass members and on which a finger 103 having a skin surface 103A with ridge/valley portions is pressed; 104, a light source; and 105, an image detection unit for detecting the behavior (scattering and absorption) of light which is irradiated from the light source 104 and incident on a transparent body surface 101S through the transparent body 101, as an image fingerprint pattern viewed from the front of the skin surface 103A.

The surface 101S of the transparent body 101, on which the finger 103 is pressed, has a fine three-dimensional unevenness to form a scattering surface. A surface film layer 112 is formed on the surface 101S of the transparent body 101 via a small gap. The surface film layer 112 has a lubricating surface (film) directly contacting the finger 103, and a viscoelastic surface (film) opposing the surface 101S of the transparent body 101, as will be described later. An intermediate layer (fluid layer) 111 in which a gas or liquid is sealed is formed between the surface film layer 112 and the surface 101S of the transparent body 101.

In this arrangement, when the skin surface 103A is pressed against the surface 101S of the transparent body 101, a three-dimensional pattern formed from the ridge portions (projecting portions) and valley portions (recessed portions) of the skin surface 103A is transferred to the surface film layer 112. The surface film layer 112 with the transferred three-dimensional pattern contacts the surface 101S of the transparent body 101 via the intermediate layer 111 at portions corresponding to the ridge portions of the skin surface 103A. The difference in behavior of light between an area where the surface film layer 112 contacts the surface 101S of the transparent body 101 and an area where the surface film layer 112 does not contact the transparent body surface 101S, i.e., scattering and absorption of light are detected by the image detection unit 105 as an image fingerprint pattern (a fingerprint pattern image) viewed from the front of the skin surface 103A.

FIG. 2 shows the main part of FIG. 1. The behavior of light incident from the light source 104 on the transparent body 101 will be described with reference to FIG. 2.

When the finger is pressed against the surface film layer 112, the surface film layer 112 contacts the surface (scattering surface) 101S of the transparent body 101 in the area of a ridge portion 131 of the skin surface 103A. On the other hand, in the area of a valley portion of the skin surface 103A, the gas or liquid in the intermediate layer 111 remains in the recessed portion, so the surface film layer 112 does not contact the surface 101S of the transparent body 101. More specifically, the surface film layer 112 is deflected and deforms along the three-dimensional pattern of the skin surface 103A, so the surface film layer 112 contacts the surface 101S of the transparent body 101 only in the area of the ridge portion 131.

Light incident from the light source 104 on the transparent body 101 is irradiated on the surface 101S of the transparent body 101. The gas or liquid in the intermediate layer 111 has a refractive index ne lower than refractive indices nf and nb of materials of the surface film layer 112 and transparent body 101.

In the area of a valley portion 132, the intermediate layer 111 contacts the surface 101S of the transparent body 101, so the light hardly passes through the intermediate layer 111. For this reason, the light scatters on the surface 101S of the transparent body 101 and partially reaches the image detection unit 105. On the other hand, at the ridge portion 131, the surface film layer 112 contacts the surface 101S of the transparent body 101, so most light is absorbed by the surface film layer 112. Therefore, the image detection unit 105 positioned in front of the skin surface 103A detects a fingerprint pattern having dark ridge portions 131 and bright valley portions 132, as in the reflection light scheme.

As the transparent body 101, transparent parallel plates having a surface formed as the scattering surface 101S, like ground glass, are used. As the material, an optical glass material or transparent plastic material is used. Especially, the scattering surface 101S is formed by a known process technique such as polishing or sandblasting using abrasive grains. The three-dimensional unevenness on the scattering surface 101S depends on the grain size of abrasive grains to be used. If the grain size is too large, the precision or contrast of the fingerprint pattern tends to lower, and an excessively small grain size also tends to lower the contrast.

Therefore, the suitable abrasive grain size is Nos. 600 to 3,000, and more preferably, Nos. 900 to 2,000. At this time, the three-dimensional unevenness on the scattering surface 101S has a depth of about 1 to 30 μm and, more preferably, a depth of about 5 to 20 μm. When the three-dimensional unevenness on the scattering surface 101S has slightly rounded edges, the adhesion between the surface (scattering surface) 101S of the transparent body 101 and the surface film layer 112 is improved, so a more satisfactory fingerprint pattern can be obtained.

To round the edges of the three-dimensional unevenness on the scattering surface 101S of the transparent body 101 consisting of a glass material, a known method of lightly etching the polished surface using diluted hydrofluoric acid is available. If the transparent body 101 consists of a plastic material, a known method of lightly dissolving the polished surface using an organic dissolvent having an appropriate solubility can be used.

For example, a parallel plane substrate consisting of borosilicate crown glass having a refractive index of 1.52 is used, and one surface thereof is polished using abrasive grains No. 1,200, a scattering surface having a three-dimensional unevenness with an average depth of 8 μm can be formed. Another surface which has not been polished and the peripheral portion are protected with wax, and the entire structure is dipped in about 1% hydrofluoric acid. With this process, the edges of the three-dimensional unevenness on the scattering surface can be made round.

The intermediate layer 111 is formed by sealing a gas or fluid between the surface 101S of the transparent body 101 and the surface film layer 112. Since the depth of the three-dimensional pattern of the skin surface 103A is about 50 μm, a thickness of 50 μm suffices for the intermediate layer 111. However, when the finger is pressed against the transparent body, an excess gas or fluid is pressed and moves to the peripheral portion, no problem is posed in the thickness of the intermediate layer 111 of 50 μm or more. Even when the intermediate layer 111 has a thickness smaller than 50 μm, the surface film layer 112 is satisfactorily fitted at least to the three-dimensional pattern of the skin surface 103A, so no problem is posed.

Air sufficiently functions as a gas to be sealed in the intermediate layer 111. As a fluid J, almost all fluids represented by water can be used.

However, a fluid having an excessively high viscosity is not suitable to use because when the finger is pressed against the transparent body, a relatively long time is required to obtain the equilibrium state of stress in the intermediate layer 111.

The kinematic viscosity of the fluid can be about 5,000 mm$^2$/s or less at room temperature and, more preferably, about 1,000 mm$^2$/s or less. For example, a colorless and transparent silicone oil having a kinematic viscosity of about 500 mm$^2$/s and a refractive index of 1.38 can be used.

As the surface film layer 112, a plastic film of polyethylene, polypropylene, polyester, polyethylene terephthalate, or the like can be used. The thickness of the surface film layer 112 is selected within the range of about 5 to 50 μm and, more preferably, about 10 to 30 μm. For example, there are polyethylene terephthalate films having various thicknesses, and an easily accessible film having a thickness of 10 μm has a sufficient mechanical strength and a refractive index of 1.65.

As the surface film layer 112, a film consisting of a rubber material such as natural rubber, silicone rubber, or urethane rubber may be used instead of the plastic film. Rubber materials are poor in light transmittance, and their optical characteristics such as a refractive index are not distinctive. However, in an area where the surface film layer 112 contacts the transparent body 101, a rubber material can sufficiently absorb light propagating through the transparent body 101, so a satisfactory fingerprint pattern can be obtained. Since the rubber material has a higher flexibility than that of the plastic film, a more satisfactory fingerprint pattern can be obtained even when the film thickness is increased to more than 50 μm.

When a thin rubber film is used as the surface film layer 112, the rubber film is readily damaged in careless use, e.g., by applying an unnecessary force upon pressing the finger because of high adhesion between the rubber film and the finger pressed against the film, although this poses no problem in case of a plastic film. To prevent this, a lubricating film 112A having release properties is formed on the contact surface film layer 112 to the finger, as shown in FIG. 2, so that a sufficiently practical film can be obtained.

A fluororesin or silicone-based releasing agent can be suitably used as the lubricant used for the lubricating film 112A. A fluororesin dissolved in a perfluoro-solvent is known as a resin suitable to form a film as thin as possible. Especially, a fluororesin having amorphous characteristics is readily dissolved, so a thin film having a thickness of about 1 μm can be formed by spin coating, dip pulling, or spraying.

In this case, when a silane-based coupling agent is applied to the rubber film surface in advance, the adhesion between the coating film and the rubber film can be increased. After the resin is applied, the film is heated at a temperature of about 130° C. or less to dry the medium, thereby forming the lubricating film 112A.

A solution type or emulsion type releasing agent is known as a silicone-based releasing agent. A thin coating film can be formed by the above method, and a lubricating film is formed by heating and drying at about 150 to 200° C. In this case as well, a silane-based coupling agent can be effectively used to increase the adhesion to the rubber film.

The adhesion between the surface film layer 112 and the surface 101S of the transparent body 101 when the finger is pressed against the transparent body will be described. In case of a rubber material, the surface film layer 112 is easily fitted to the three-dimensional unevenness on the scattering surface because of its elasticity. However, when a plastic film is used, no sufficient adhesion is obtained, and as a result, the contrast of the fingerprint pattern may lower. To prevent this, a thin viscoelastic film 112B is applied to the surface of the plastic film, which contacts the transparent body 101, as shown in FIG. 2.

For example, one of heat curing two-pack type silicone rubbers is a liquid having a colorless and transparent outer appearance after mixing and a viscosity of about 1.1 Pa·s, i.e., about thousand times that of water. Twenty wt % of a thinner as a diluent are added to almost halve the viscosity, and the rubber is uniformly applied to a surface of a polyethylene terephthalate film having a thickness of about 10 μm, on which a silane-based coupling agent has been applied in advance, to a thickness of about 10 μm. This film having a multilayered structure is used as the surface film layer 112. In this case, a more satisfactory fingerprint pattern can be obtained as compared to use of only the plastic film.

An experiment conducted by the present inventor revealed that in the conventional fingerprint detecting device based on the reflection light scheme, as shown in FIG. 3, in which the finger was directly pressed against the surface 1S of the transparent body 1, when air was dry in winter, the ridge portion of the fingerprint pattern was not detected as a solid line, and only a broken fingerprint pattern was obtained in many cases. The reason for this is as follows. The ridge portion (projecting portion) of the skin surface 3A has sweat glands, so the ridge portion itself has a three-dimensional pattern because of the sweat glands.

Characteristics can hardly be extracted from the fingerprint pattern with the broken ridge portion of the skin surface 3A by image processing. In individual identification using such a fingerprint pattern, the recognition ratio largely lowered to 80% or less, though, at normal humidity, a recognition ratio of about 95% or more is obtained.

In summer at a high temperature and humidity, sweat or grease is always secreted from the sweat glands to fill the valley portions. For this reason, in the conventional fingerprint detecting device, adjacent ridge portions are connected to make the fingerprint pattern vague. For individual identification using such a fingerprint pattern, the recognition ratio largely lowered to 70% or less.

In the conventional fingerprint detecting device using the scattering light scheme in which the finger is directly depressed against the surface 11S of the transparent body 11 formed from parallel plates, light propagating through the transparent body 11 scatters at the ridge portions (projecting portions) of the fingerprint 13A directly contacting the transparent body 11, and this phenomenon is utilized to detect the fingerprint pattern. However, the amount of light scattering at the ridge portions is substantially small, and most light is absorbed. In the conventional scattering light scheme, a fingerprint pattern having bright ridge portions and dark valley portions (recessed portions) is obtained. However, the ridge portions are not so bright while the valley portions are not so dark because they are irradiated with light absorbed by the ridge portions. As a result, a fingerprint pattern having low contrast as a whole is obtained.

In the fingerprint detecting device using the scattering light scheme according to the present invention shown in FIG. 1, the intermediate Layer 111 and the surface film layer 112 are formed on the surface 101S of the transparent body 101. With this arrangement, the three-dimensional pattern of the skin surface 103A can be satisfactorily transferred to the surface film layer 112 and the intermediate layer 111 independently of the dry or wet condition of the finger. By detecting the fingerprint pattern from the transferred pattern, a variation in optical detection condition due to an external factor such as adhesion of sweat, grease, or floating dust can be suppressed.

In the present invention, even in winter under a dry condition or summer under a high temperature and humidity condition, the recognition ratio does not lower or rather is improved to 97% or more on the average. Though a fingerprint detecting individual identification system using a fingerprint detecting device of conventional type is limited for use in a small group, the system using the fingerprint detecting device of the present invention allows wide applications in various situations.

In the present invention, a scattering surface having a fine three-dimensional unevenness is formed on the surface 101S of the transparent body 101. For this reason, a fingerprint pattern whose bright and dark portions are reversed to those in the conventional scattering light scheme, i.e., a fingerprint pattern of the skin surface 103A which has dark ridge portions and bright valley portions can be obtained although the fingerprint detecting device uses the scattering light scheme.

This fingerprint pattern is the same as that obtained by the above-described reflection light scheme. When the finger 103 is not being pressed against the surface 101S of the transparent body 101, the entire image becomes white. For this reason, when the pattern is to be detected by an image sensor such as a CCD sensor, white level adjustment of the sensor is facilitated. Unlike the conventional scattering light scheme, the light source for white level adjustment need not be arranged, and it is preferable for practical use.

Figure 4:
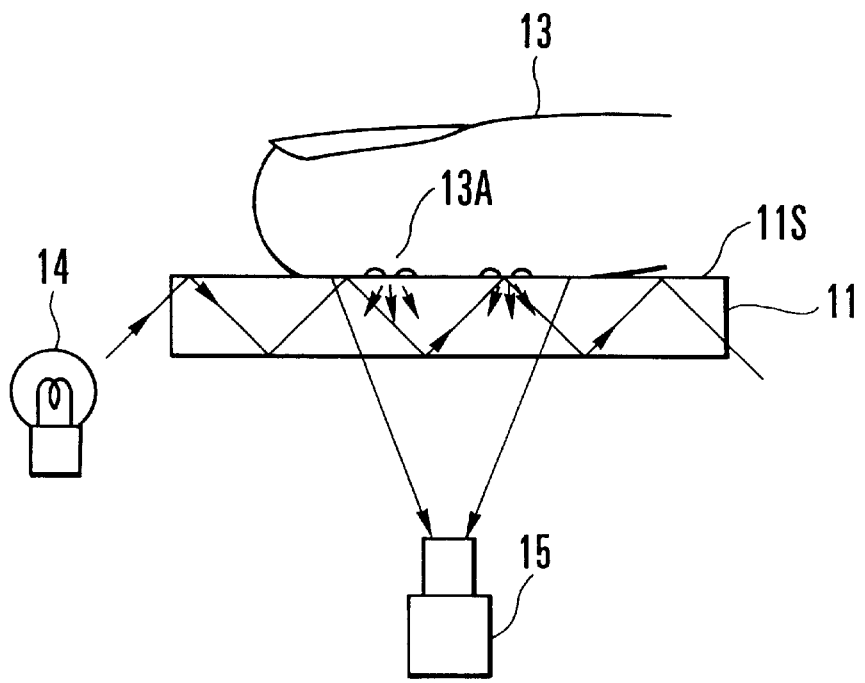
FIG. 4 is a schematic view of another conventional fingerprint detecting device (scattering light scheme)

In the present invention, since the fact that absorption is more dominant than scattering at the ridge portions of the skin surface 103A is utilized, a fingerprint pattern with very high contrast can be obtained. For example, when it is assumed that the white level in the conventional reflection light scheme (FIG. 3) is 100, the white level in the conventional scattering light scheme (FIG. 4) is 20 or less.

However, according to the scattering light scheme of the present invention, the white level is 80 or more, i.e., the white level can be increased to almost the same level as that of the conventional reflection light scheme.

Unlike the reflection light scheme in which almost the whole incident light emerges, it is difficult to eliminate dissipated light components in the scattering light scheme, so it is impossible in principle to improve the white level to the same level as that of the reflection light scheme. However, the present invention can achieve a white level which poses no practical problem.

In addition, the present invention, can sufficiently utilize the advantage of the scattering light scheme, i.e., the advantage that a fingerprint pattern viewed from the front of the skin surface is obtained. For this reason, distortion correction for a fingerprint pattern obliquely viewed from the skin surface need not be performed. The focal depth of the optical lens can be small, so the device can be made compact.

As has been described above, according to the present invention, even when sweat, grease, or dust is adhered on the skin surface, or the finger is dry to make the fine three-dimensional pattern of the ridge portions of the skin surface conspicuous, a satisfactory fingerprint pattern can always be obtained.

In addition, since a fingerprint pattern viewed from the front of the skin surface can be obtained, oblique distortion correction for the fingerprint pattern becomes unnecessary, unlike the conventional reflection light scheme, and size reduction of the device can be realized.

Furthermore, a fingerprint pattern with much higher contrast than that in the conventional scattering light scheme can be obtained. In addition, when the pattern is to be detected by an image sensor such as a CCD sensor, white level adjustment of the sensor is facilitated. Since no light source for white level adjustment need be arranged, it is preferable for practical use.

What is claimed is:

1. A fingerprint detecting device comprising:
    a flat transparent body on which a skin surface of a finger is pressed, said transparent body having a surface constituted by a scattering surface with a fine three-dimensional unevenness, on which said skin surface is pressed;
    a light source for irradiating incident light from an inside of said transparent body on said skin surface pressed against said surface of said transparent body;
    a thin surface film layer formed on said surface of said transparent body via a small gap, on which a three-dimensional pattern of said skin surface is transferred by pressing said finger;

a fluid layer formed by sealing one of a gas and a liquid in the gap between said surface of said transparent body and said surface film layer, said fluid layer being pressed by said surface film layer on which said three-dimensional pattern of said skin surface is transferred; and image detection means for detecting an image fingerprint pattern on the basis of the light from said light source, the reflection of which is changed at said surface of said transparent body, when said surface film layer comes into contact with said surface of said transparent body in accordance with said three-dimensional pattern of said skin surface.

2. A device according to claim 1, wherein the incident light from said light source is absorbed in an area where said surface of said transparent body contacts said surface film layer, and the incident light from said light source is scattered in an area where said surface of said transparent body contacts said fluid layer.

3. A device according to claim 2, wherein said transparent body has a first refractive index, said surface film layer has a second refractive index, and said fluid layer has a third refractive index lower than the first and second refractive indices.

4. A device according to claim 1, wherein said scattering surface of said transparent body has unevenness with a depth of 1 to 30 $\mu$m.

5. A device according to claim 4, wherein said scattering surface of said transparent body preferably has a three-dimensional unevenness 5 to 20 $\mu$m deep.

6. A device according to claim 1, wherein said scattering surface of said transparent body has a fine three-dimensional unevenness with round edges.

7. A device according to claim 1, wherein said surface film layer has a thickness of 5 to 50 $\mu$m.

8. A device according to claim 7, wherein said surface film layer preferably comprises a plastic film having a thickness of 10 to 30 $\mu$m.

9. A device according to claim 1, wherein said surface film layer has, on a surface opposing said surface of said transparent body, a viscoelastic film which comes into contact with said fine three-dimensional unevenness on said surface of said transparent body when said finger is pressed against said transparent body.

10. A device according to claim 1, wherein said surface film layer essentially consists of a rubber material.

11. A device according to claim 10, wherein said surface film layer has, on a surface on which said skin surface is pressed, a thin lubricating film having releasing properties.

12. A device according to claim 1, wherein the gas or liquid forming said fluid layer has a high viscosity of not more than 5,000 mm$^2$/s at room temperature.

13. A device according to claim 12, wherein said fluid layer is preferably formed by a liquid having a kinematic viscosity of not more than 1,000 mm$^2$/s.

* * * * *